Feb. 20, 1951 A. S. KNAPP 2,542,280
CATTLE SPRAY CHUTE
Filed Feb. 21, 1949 3 Sheets-Sheet 3
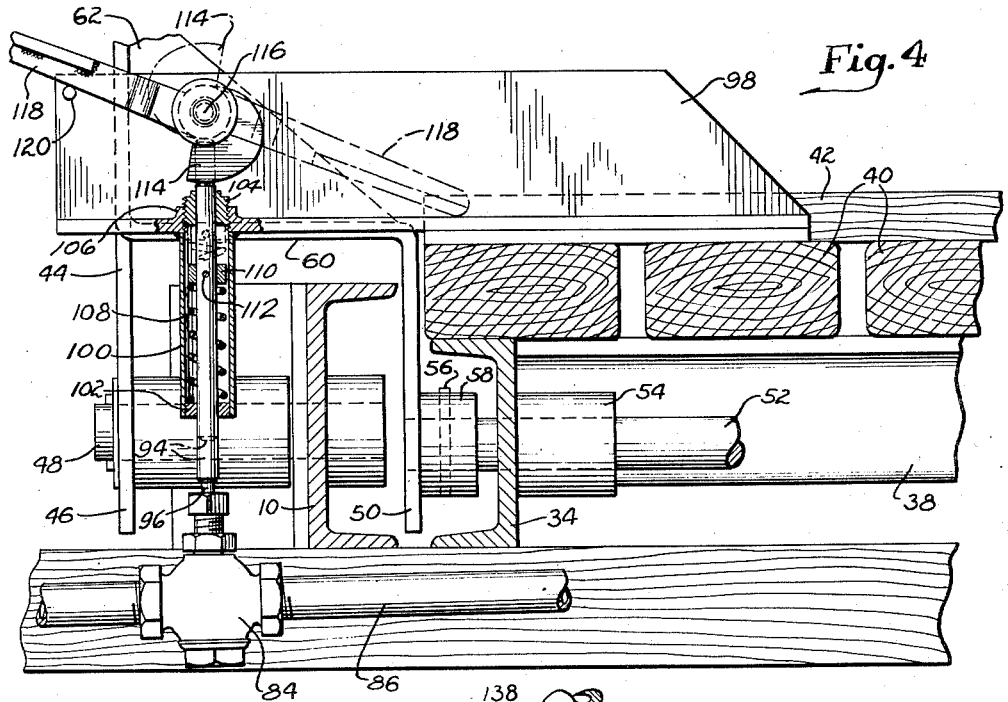
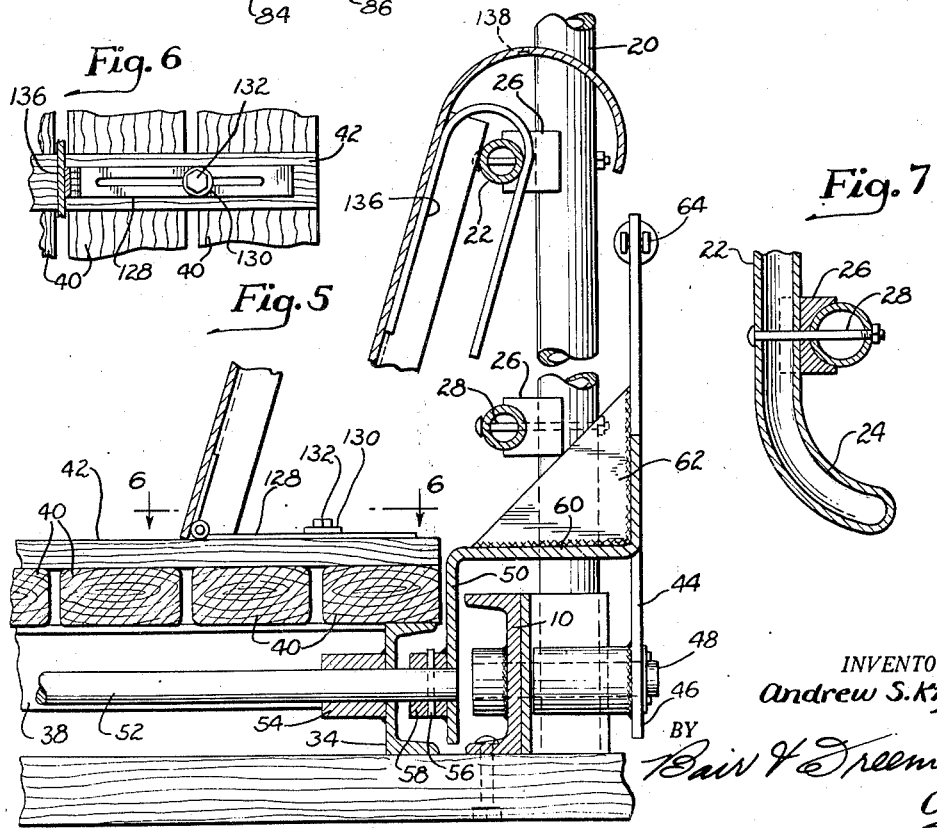
INVENTOR.
Andrew S. Knapp
BY
Bair & Freeman
Attys.

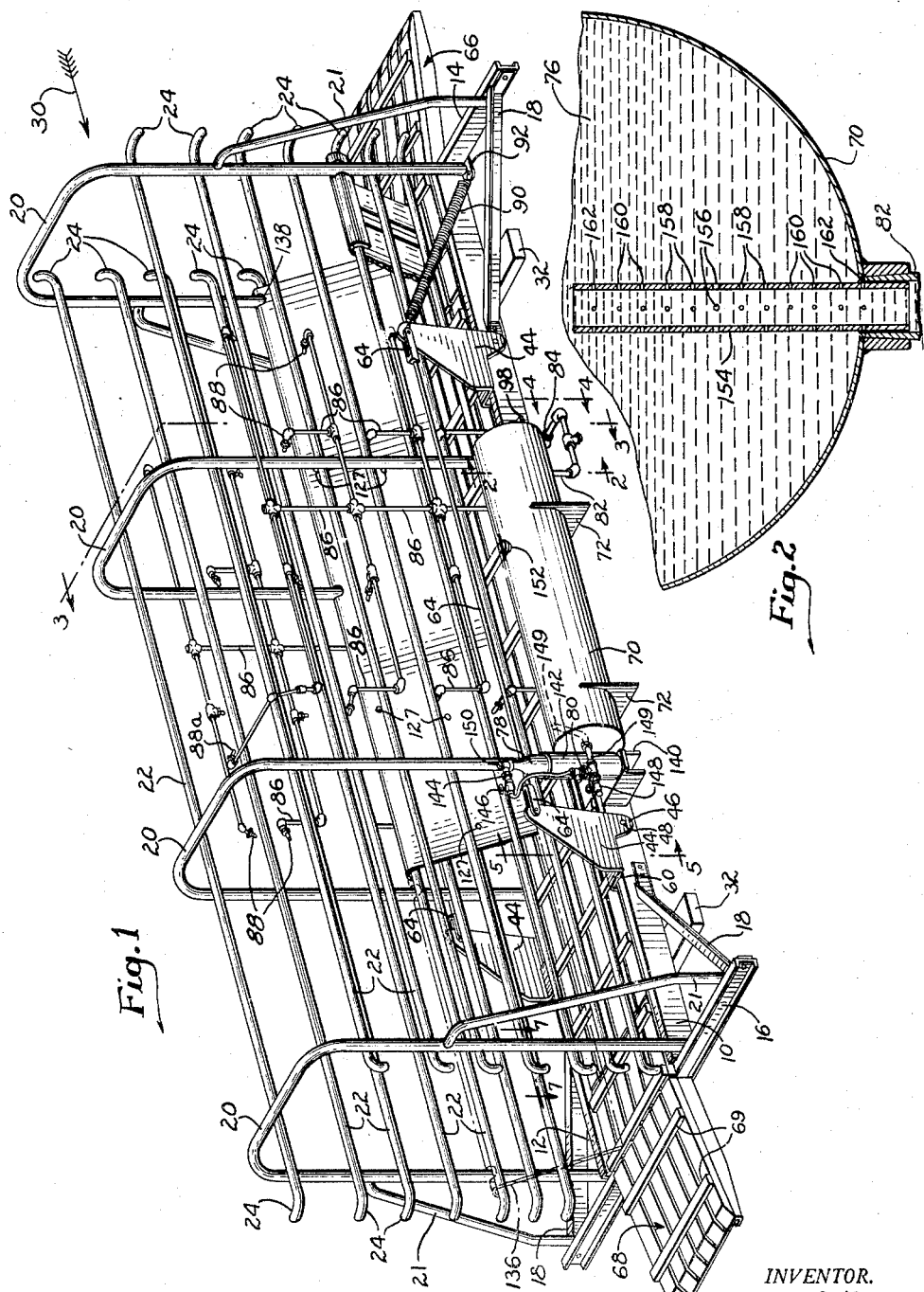

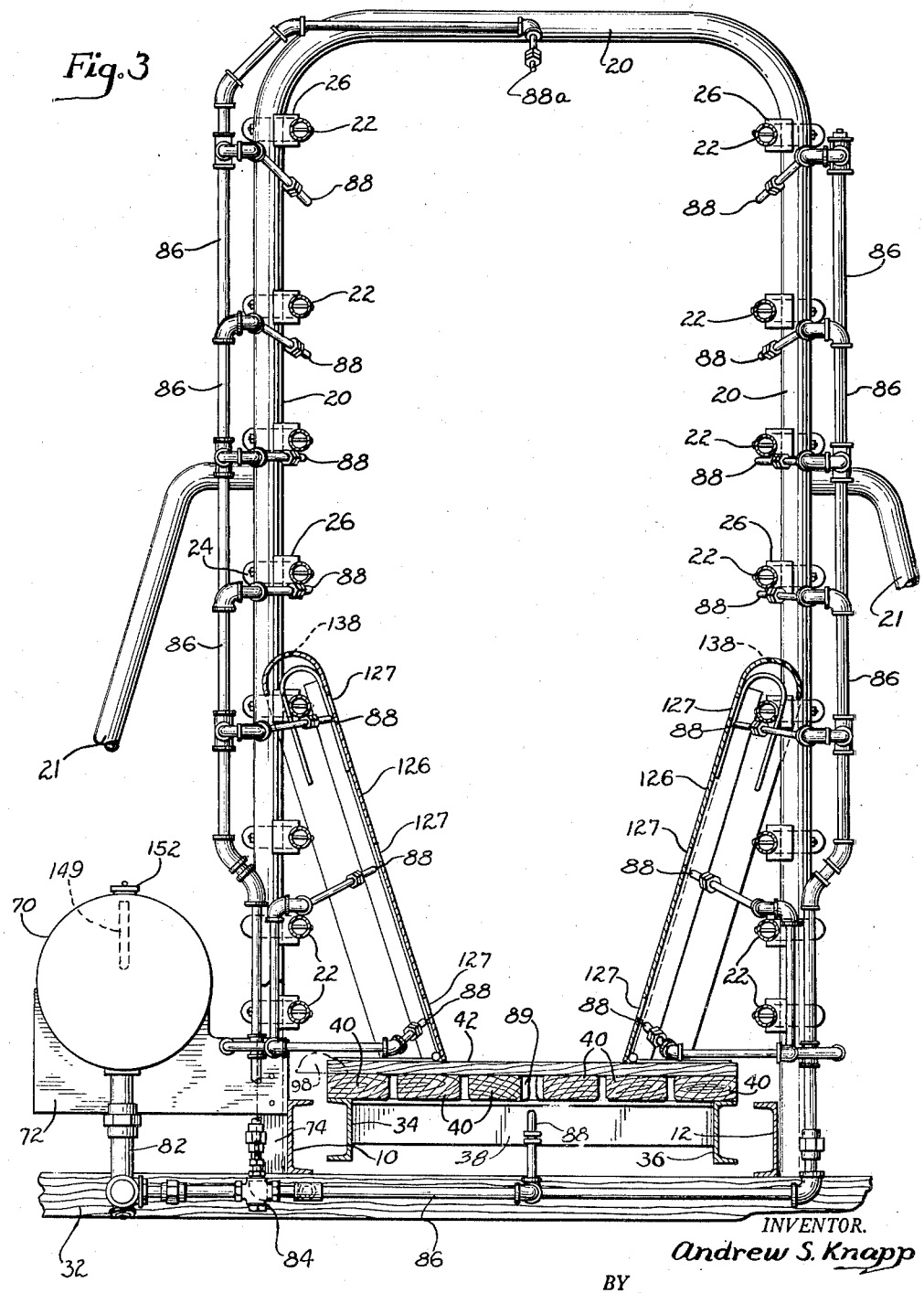

Patented Feb. 20, 1951

2,542,280

UNITED STATES PATENT OFFICE 2,542,280

CATTLE SPRAY CHUTE

Andrew S. Knapp, St. Louis, Mo., assignor to Knapp-Monarch Company, St. Louis, Mo., a corporation of Delaware Application February 21, 1949, Serial No. 77,480

5 Claims. (Cl. 119—159)

This invention relates to a spray chute for spraying cattle or other animals, the primary object of the invention being the complete spraying of each animal automatically upon its entry into a chute or as it passes through the chute.

One object of the invention is to provide a spraying operation that covers the animal entirely with the sprayed material preferably directed "against the grain" of the animal's hair or fur.

Another object of the invention is to provide a spray chute which is safe to operate, that is, permits the animal to pass through it without any danger of harming the animal as when they are forced to pass through a dip tank, thus subjecting the animal to possible slipping on ramps and frightening the animal especially if it is adverse to entering the tank.

Still another object is to provide a spray chute which eliminates all tendency for the animal to lurch through the chute or into or out of a pit if used, the animal instead walking on a level platform which is clearly visible at all times and may be open at the far end, thus encouraging the animal to pass through without any possible danger from lurching.

A further object is to provide a sprayer which is quiet in operation, thus tending to enhance safety to the animal.

Still a further object is to provide a spray chute which is economical in the use of insecticide or other material used, the chute being automatic, that is the spray nozzles being in operation only while the weight of the animal is imposed on a platform of the chute.

An additional object is to provide a spray chute which is readily portable so that it can be transported to various parts of a farm, stock-yard or the like.

Another additional object is to provide a spray chute which includes a floating platform with means to preferably maintain the platform level yet permit slight downward movement when the weight of an animal is imposed thereon and the downward movement effecting the opening of a valve that permits the insecticide under pressure to pass through various piping elements to one or a plurality of nozzles, for instance located above and below the animal and at each of his sides.

A further additional object is to provide a squeeze type of chute that insures the animal passing along substantially the center of the platform for most effective and even spraying and without any possibility of the animal being harmed by contact with frame elements that constitute the general framework of the chute.

With these and other objects in view, my invention consists in the construction, arrangement and combination of the various parts of my spray chute whereby the objects contemplated are attained, as hereinafter more fully set forth, pointed out in my claims and illustrated in the accompanying drawings, wherein:

Figure 1 is a perspective view of a spray chute embodying my present invention.

Figure 2 is an enlarged vertical section with parts broken away, through an insecticide tank of the chute as taken on the line 2—2 of Figure 1.

Figure 3 is an enlarged vertical sectional view on the line 3—3 of Figure 1.

Figure 4 is a more greatly enlarged detail sectional view on the line 4—4 of Figure 1.

Figure 5 is an enlarged sectional view with parts broken away, on the line 5—5 of Figure 1.

Figure 6 is a sectional view on the line 6—6 of Figure 5, and

Figure 7 is an enlarged sectional view on the line 7—7 of Figure 1.

On the accompanying drawings I have used the reference numerals 10 and 12 to indicate stationary side frame members which as shown in Figure 3 are channel shaped in cross section. These are connected by cross members 14 and 16 at the rearward and forward ends of the frame, the cross members extending beyond the frame and being braced relative thereto by elements 18 to prevent any twisting of the frame in a horizontal plane to a position where the parts are not properly aligned.

The frame of the chute further includes inverted U-shaped elements 20 formed of pipe or steel tubing with their lower ends welded to the frame members 10, 12, 14 and 16. The end elements 20 are braced against distortion in the vertical plane by slanting braces 21. The frame members 20 are connected together by longitudinally extending tubes or pipes 22 having curved ends 24, the manner of connection being shown in Fig. 7 and consisting of spacer blocks 26 interposed between 20 and 22 and bolts 28 extending through all three elements to hold them assembled. The spacer blocks are provided with curved seats for the pipes 20 and 22. The curvature at 24 directs the animal into the chute, the entry end being at the right in Figure 1 as indicated by the arrow 30. Likewise at the exit end of the chute the curved ends 24 prevent the animal harming himself by lurching against the chute when leaving it.

For supporting the chute frame on a ground surface or the like, I provide a pair of cross members 32 formed of hardwood and connected with the lower edges of the side frames 10 and 12.

With the frame defined by the elements 10, 12, 14 and 16, I provide a floating platform having side members 34 and 36 connected by means of angle members 38 welded between the channels 34 and 36. The angles 38 support longitudinally extending planks 40 which are bolted or otherwise suitably secured thereto to form a platform on which the animal may walk through the chute. Cross cleats 42 on the planks 40 provide traction for the feet of the animal and prevent him from slipping or losing his foothold should he begin to slip while walking along the platform.

For floatingly mounting the platform in relation to the frame of the chute and at the same time maintain its level position, I provide bell cranks 44 each having a projection 46 pivoted at 48 to the frame members 10 and 12 and an offset projection 50 connected with pivot shafts 52 through the platform side members 34 and 36 as shown in Figure 5. The pivot shafts 52 extend rotatably through hubs 54 welded to the frame members 34 and 36 and their ends are pinned at 56 in hubs 58 welded to the projections 50. The offsets between the projections 50 and 46 are shown at 60 and these are reinforced by gusset plates 62 welded in position.

The upper ends of th bell cranks are connected together by a link 64 at each side of the chute so that all four bell cranks are simultaneously movable since they are also connected together by the pivot shafts 52 and the pins 56. This insures that the floating platform will rise and fall equally at all points and thus remain level at all times to minimize any frightening effect on the animal passing therealong. The bell crank arrangement disclosed insures that the amount of vertical movement is always the same at all points of the platform regardless of the position on the platform occupied by the animal and the bracing 18 and 21 insures smooth operation of the floating platform.

In order to avoid a step up at the entry end of the spray chute and a step down at the exit end thereof ramps 66 and 68 are hinged thereto as shown in Figure 1 and are provided with cross cleats 69.

The spray applying mechanism comprises a tank 70 mounted on supports 72 which in turn are secured to short pieces of angle 74 connected to the frame member 10 as shown in Figure 3. A suitable insecticide or other treatment liquid 76 is adapted to be contained in the tank 70 and the tank is adapted to receive gas under pressure from a cylinder 78 through a reducing valve 80.

This tends to expel the liquid through a pipe 82 which leads to a valve 84 from which a plurality of other pipes 86 lead to various nozzles 88. These nozzles are distributed circumferentially around the cross sectional outline of the chute as shown in Figure 3 and are directed forwardly at an angle as shown in this figure and in Figure 1 so as to completely circumscribe the animal and discharge insecticide forwardly at an angle against him so as to enter his hair or fur and thus penetrate to the skin which is particularly desirable for instance in connection with spraying cattle with DDT or the like to prevent flies from bothering them.

For the upwardly directed spray nozzles 88 at the bottom the platform is provided with openings 89 through which the spray is discharged. Only one nozzle 88a shown in Figure 1 is set in a direction facing the animal in order to reach the forehead and horns. All of the other nozzles are so mounted as to minimize the possibility of the insecticide getting into the eyes, ears, nose and mouth of the animal.

The valve 84 is opened only when the platform is depressed by reason of the weight of an animal thereon. The platform is held in the raised position by a spring 90 on each side of the chute and connected with the rear bell crank and with a clip 92 on the frame as shown in Figure 1. The weight of the animal depresses the platform thus swinging the bell cranks forwardly against the bias of the springs 90 and the downward movement of the platform causes it to move from the raised position shown in Figure 3 to the lowered position in Figures 4 and 5. In this lowered position a pin 94 carried by the platform engages the operating stem 96 of the valve for opening it. The manner of supporting the pin 94 is as follows:

An angle 98 is secured to two of the planks 70 and projects over the side frame 10 as shown in Figure 4. A vertical tube 100 is welded thereto and carries a collar 102 welded in its lower end. The rod 94 is slidable through the collar 102 and through a plug 104 threaded into a boss 106 on the horizontal flange of the angle 98. A spring 108 is interposed between the collar 102 and a second collar 110 pinned as at 112 to the pin 94.

A cam 114 pivoted at 116 to the angle 98 engages the upper end of the pin 94 and may be adjusted by means of a handle 118 to extend the pin as shown by solid lines in Figure 4 when the handle is against a stop pin 120. When the handle is swung over to the dotted position then the spring 108 elevates the pin 94 so that even, though the platform is depressed the pin will not engage the valve stem 96. Thus a selecting means is provided for insuring against any spraying action during transportation of the chute from one position to another or if the chute is permanently mounted in a fence the spraying operation can be prevented if it is desirable to let the animals pass through the chute without spraying them.

The valve 84 may be constructed so that it is adjustable as to its degree of opening. Thus when the platform is in its lowermost position shown in Figures 4 and 5 with the frame elements 34 and 36 thereof resting against the cross members 32 the valve can be opened the desired degree by the pin 94 at its lower limit of movement.

Squeeze chute elements 126 are provided to prevent the animal from turning around in the chute. The squeeze chute comprises sheet metal members arranged at an angle as illustrated in Figures 3 and 5 and connected at their lower ends with the floating platform as by means of slotted straps 128 hinged to the plates 126. A washer 130 under the head of a lag screw 132 as shown in Figures 5 and 6 provides, in conjunction with the slot 134 of the strap, a means for adjusting the angle of the squeeze chutes as found desirable to accommodate the size of the animals passing through the chute.

The upper ends of the squeeze plates 126 are supported by inverted U-shaped straps 136 hooked over two of the tubes 22 in such manner that they can slide up and down in relation thereto. Thus they do not interfere with the floating action of the platform. The upper ends of the plates 126 are notched at 138 to clear the frame elements 20. The squeeze plates 126 extend preferably the full length of the chute but have been broken away in Fig. 1 to illustrate other details.

Referring to Figure 1 a support 140 is provided for the gas cylinder 78 and secured to its top surface and projecting upwardly therefrom is a cup-like receiver 142 for the gas cylinder. A union type coupling 144 is provided in the usual manner and a shut-off valve 146 is provided in addition to a blow off valve 148. The cylinder itself of course has a shut off valve 150 to be opened after the coupling 144 is adjusted.

The tank 70 has a filler plug 152 and where the insecticide passes out to the outlet pipe 82 a stand pipe 154 is provided as in Figure 2. I have found that the insecticide 76 flows out of the tank properly proportioned if the stand pipe extends about half way the height of the tank and is provided with a series of openings 156, 158, 160 and 162 graduated in the order named from about one-eighth inch to one-sixteenth inch in diameter, the largest opening 156 being one-half way the height of the stand pipe and the smaller openings distributed above and below the large ones.

By using a compressed gas cylinder as the means to produce pressure on the insecticide the spray chute is readily portable as it requires no source of power such as an electric current for operating a compressor and the operation is relatively quiet so as not to disturb the animals.

*Practical Operation*

In order to prepare for the operation of the cattle chute the tank 70 is filled through the filler plug 152 to within about one inch of the top with the proper insecticide solution. The filler cap is replaced and tightened to prevent any leakage of gas. The cylinder 78 charged with $CO_2$ or any suitable gas under pressure is then placed in the holder 142 and the pressure regulator 80 is connected with the gas cylinder by the union 144.

The blow-off valve 148 is closed (the pipe 149 extending therefrom terminating inside the tank 70 adjacent the top thereof as shown by dotted lines in Figure 3) and the valves 150 and 146 are opened to permit the gas to flow into the tank 70 for tending to discharge the insecticide 76 therefrom. The regulator 80 is set for the correct pressure (usually about 25 to 30 p. s. i.).

The chute is now ready for operation. The cattle are driven through the chute and when they step on the floating platform the valve 84 is opened as in Figure 4 forcing the pressurized insecticide solution through the piping 86 and from the nozzles 88. As soon as the animal leaves the floating platform it returns upwardly to its original position as shown in Figure 3 which of course permits the valve 84 to reclose. Accordingly the spraying operation is continued only while the animal is on the platform which keeps the consumption of insecticide at a minimum.

When the tank 70 is to be re-filled, the valve 146 is closed and the blow-off valve 148 is opened to release all the gas from the tank. The filler cap 152 may then be safely removed, the tank refilled and spraying operation can then be continued as long as there is sufficient pressure in the cylinder 78 to dispense the liquid 76 from the nozzle 68 and 88a.

The squeeze chute arrangement insures that the animals will pass through the chute without attempting to turn around, and will pass along the center of the platform so as to minimize any possibility of binding and improper operation. All parts of the chute are rounded where they might contact with the animal and the nozzles 88 are set so that they do not project in such manner as to harm the animal or be bent or broken by contact of the animal therewith. Where the nozzles are located back of the squeeze plates 126, openings 127 (see Fig. 3) are provided in alignment with the nozzles when they are lowered and those nozzles which are directed upwardly can spray through the platform by reason of openings 89 (see bottom of Fig. 3) therein.

A chute of the character disclosed prevents loss of animals from damage to them during the spraying action even when a herd of considerable size tends to cause the animals, due to the Venturi action at the entry end of the chute, to rush through the chute when they reach it.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. An automatic animal spray chute comprising vertically spaced, longitudinally extending side rails having diverging ends, a platform, each end of said chute being open and unobstructed for the free through-passage of animals, ramps leading to the ends of said platform, said platform being movably mounted, means to normally bias the platform to a raised position whereby the weight of an animal thereon will move said platform against said bias, spray nozzles for spraying an animal only when on said platform, said nozzles being directed angularly in the direction of travel of the animals through said spray chute and the nozzles first encountered by the animal being spaced a substantial distance from the entry end of said chute, a source of insecticide under pressure in communication with said nozzles, a valve for controlling the flow of insecticide from said source of pressure to said means, said valve being normally closed, and said platform being operatively connected therewith to open the same when said platform is so moved downwardly against said bias by the weight of an animal thereon.

2. In an automatic animal spray chute, a floating platform, means adjacent the sides thereof and floating therewith for constraining an animal to travel along substantially the center of said platform, both ends of the chute being open for free and unobstructed travel of animals along said platform, a plurality of nozzles located adjacent the sides of the platform for directing a spray liquid in a forward and inward direction on to an animal as its passes along the platform, the first of said nozzles being substantially spaced from the entry end of said chute, a source of liquid, means for supplying liquid under pressure from said source to said nozzles, a valve for controlling the flow of liquid, said platform being mounted for depressive movement when weight is imposed thereon and being operatively connected with said valve to open the same when so depressed.

3. In an animal spray chute, a frame, a floating platform, squeeze plates adjacent the sides of said frame and hinged at their lower edges to said platform for constraining an animal to travel along substantially the center of said platform, the upper edges of said squeeze plates being mounted for vertical floating movement relative to said frame, both ends of the chute being open for free travel of the animal, a plurality of nozzles located adjacent the sides of the platform for directing a spray liquid onto the animal, and means operated by said platform when an animal is thereon for supplying insecticide under pressure to said nozzles.

4. In an automatic spray chute for animals and the like, a tunnel-like open framework, a platform for the bottom of said frame-work, said platform being mounted for vertical movement in relation to said frame-work and spring mounted whereby a weight thereon depresses the same, a plurality of nozzles along the sides and top of said frame-work and directed angularly forwardly with relation to the movement of an animal through said frame-work, nozzles beneath said platform and also directed angularly forwardly, said nozzles being spaced a substantial distance from the entry end of said chute to insure that an animal is well within the chute before the spray strikes him, said platform being open adjacent said last nozzles to permit the unobstructed spray of liquid therefrom, a source of liquid communicating with said nozzles, compressed gas imposed on the liquid to place it under pressure, a normally closed control valve interposed between said source and said nozzles, and means projecting from said platform and engageable with said control valve to open the same when the platform is depressed.

5. In a spray chute for animals or the like, a tunnel-like passage, a platform for the bottom of said passage, said platform being mounted for vertical movement in relation to said passage and spring mounted whereby a weight thereon depresses the same, a plurality of nozzles along the sides and top of said passage, a source of liquid communicating with said nozzles, a control valve interposed between said source and said nozzles, means projecting from said platform and engageable with said control valve to open the same when the platform is depressed, and upwardly and outwardly sloping baffle plates along the sides of said passage for confining an animal passing therealong to substantially the central portion of said platform whereby to effect substantially the equal spraying of the animal from all sides, said baffle plates resting on said platform and being floatingly mounted in relation to said passage.

ANDREW S. KNAPP.

REFERENCES CITED

The following references are of record in the file of this patent:

UNITED STATES PATENTS

| Number | Name | Date |
|---|---|---|
| 876,631 | Goff | Jan. 14, 1908 |
| 902,638 | Allison | Nov. 3, 1908 |
| 1,133,901 | Winslow | Mar. 30, 1915 |
| 1,273,311 | Barnes | July 23, 1918 |
| 1,522,426 | Durham | Jan. 6, 1925 |
| 1,696,460 | Teyen et al. | Dec. 25, 1928 |